United States Patent [19]

Grinsted et al.

[11] Patent Number: 4,802,793
[45] Date of Patent: Feb. 7, 1989

[54] PIPELINE OR CABLE PLOUGH

[75] Inventors: Timothy W. Grinsted, Ovingham; Alan R. Reece, Wylam, both of England

[73] Assignee: Soil Machine Dynamics Limited, Stocksfield, England

[21] Appl. No.: 186,708

[22] Filed: Apr. 19, 1988

Related U.S. Application Data

[63] Continuation of Ser. No. 911,338, Sep. 25, 1986, abandoned.

[30] Foreign Application Priority Data

Oct. 3, 1985 [GB] United Kingdom ............... 8524410

[51] Int. Cl.$^4$ ............................ F16L 1/04; E02F 5/02
[52] U.S. Cl. .................................. 405/161; 405/159; 405/164
[58] Field of Search ............................ 464/745–747

[56] References Cited

U.S. PATENT DOCUMENTS

| | | | |
|---|---|---|---|
| 2,795,111 | 6/1957 | Richardson | 405/161 |
| 2,875,585 | 3/1959 | Little | 405/161 |
| 2,992,537 | 7/1961 | Callahan | . |
| 3,004,392 | 10/1961 | Symmank | 405/162 X |
| 3,429,132 | 2/1969 | Martin | 405/161 |
| 3,583,170 | 6/1971 | DeVries | 405/162 |
| 3,732,701 | 5/1973 | Lynch | 405/162 |
| 3,803,856 | 4/1974 | Faldi | 405/161 |
| 4,022,028 | 5/1977 | Martin | 405/159 |
| 4,106,335 | 8/1978 | Shatto | . |
| 4,245,927 | 1/1981 | Wharton | 405/161 X |

FOREIGN PATENT DOCUMENTS

| | | |
|---|---|---|
| 0010915 | 5/1980 | European Pat. Off. . |
| 1400095 | 7/1975 | United Kingdom . |
| 2001119 | 1/1979 | United Kingdom . |
| 2017785 | 4/1982 | United Kingdom . |

OTHER PUBLICATIONS

"Land and Marine Seabed Trenching" publication, Land and Marine Engineering.
Pamphlet: STP 3000 ETPM New Plough, ETPM, France.
Two Photographs of Plow PBP1, As Illustrated in Land and Marine Seabed Trenching Publication.

Primary Examiner—Dennis L. Taylor
Attorney, Agent, or Firm—Cushman, Darby & Cushman

[57] ABSTRACT

The plough consists of two portions separable by rams (72). Each portion comprises a beam (14, 16) joined to a plough body part (18, 20). The portions include two pairs of longitudinally-spaced arms (69) interconnected by pivots (70). At each end of the plough a support including bearers (61) is closed by a ram (59) to entrap the pipeline (26). Another ram lifts the support to raise the pipeline between the plough body parts (18, 20). The support ram is connected to a pressurized accumulator so that the support rollers (62) are kept against the pipeline (26) as the plough rises and falls and pitches. The elevated positions of the arms (69) and the relatively short separation between the two pairs of arms (69) allows the plough to descend and pitch relatively to the pipeline. In a modification the two beams are joined by rigid bridging structure and the plough body parts are pivotally connected to their respective beams. In other modifications the supports are dispensed with; or only one is used.

6 Claims, 6 Drawing Sheets

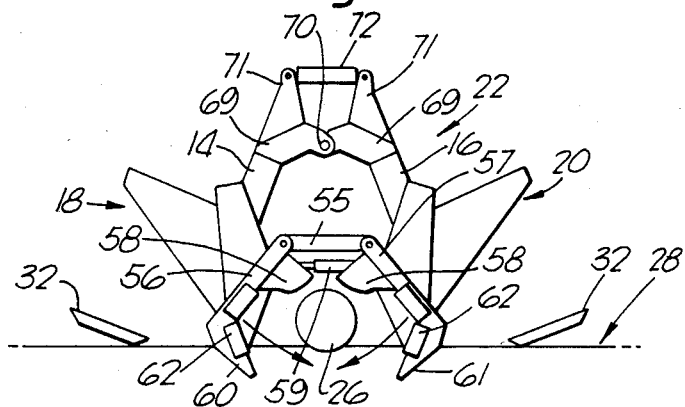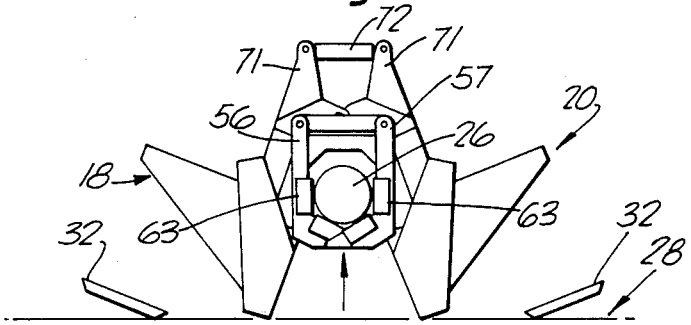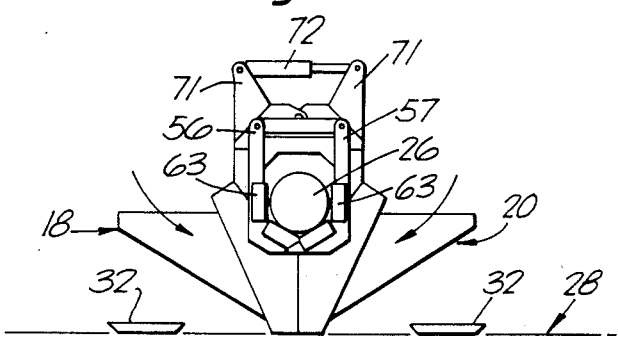

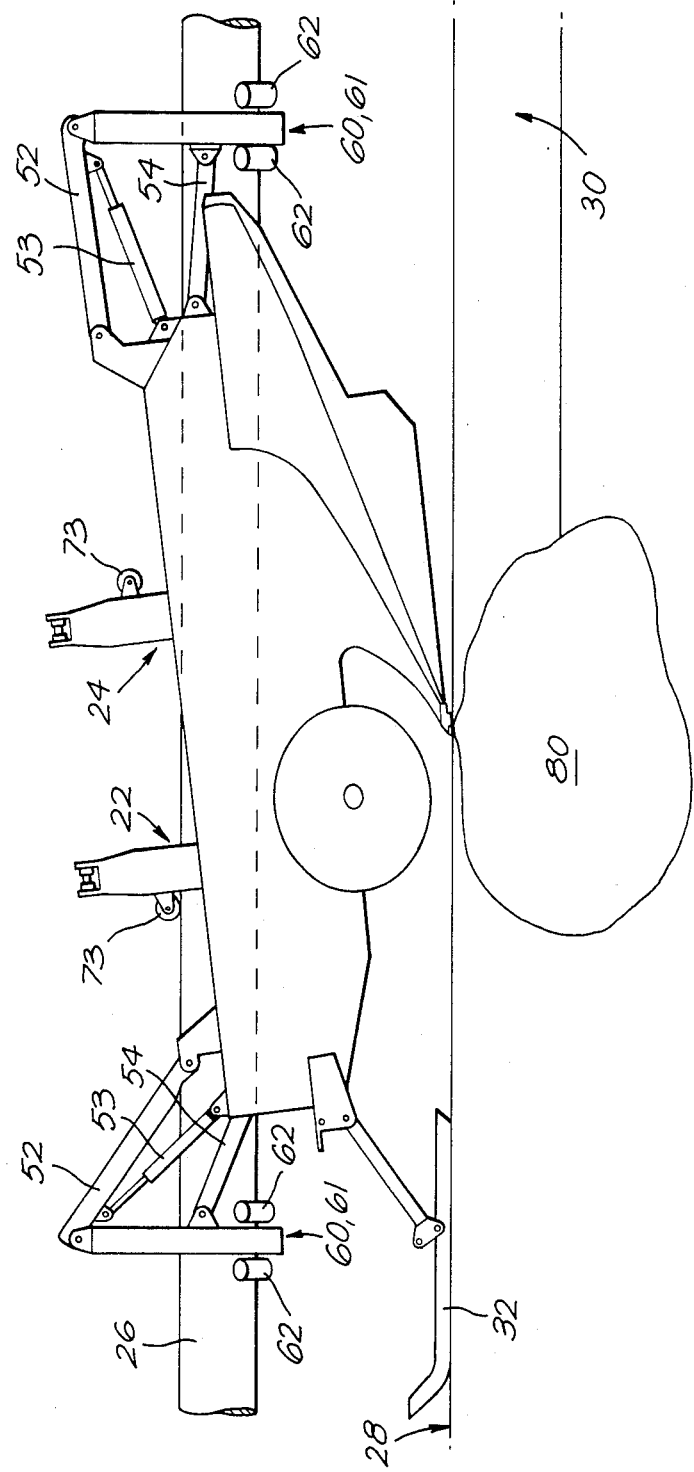

PIPELINE OR CABLE PLOUGH

This is a continuation of application Ser. No. 911,338, filed Sept. 25, 1986, which was abandoned upon the filling hereof.

CROSS-REFERENCE TO RELATED APPLICATIONS

Reference may be made to our U.S. patent applications Ser. No. 677,025 (now U.S. Pat. No. 4,585,372) and Ser. No. 809,268 assigned to Soil Machine Dynamics Limited disclosing ploughs having features of construction similar to those disclosed herein.

BACKGROUND OF THE INVENTION

The invention relates to ploughs for entrenching pipelines, cables or the like, for example in the bed of a body of water.

A plough is described in British Pat. No. 2,017,785 in which two separate plough body shares are connected to respective beams. The beams are connected at their forward ends about vertical pivot axes to structure extending across the pipeline. The pivots allow the beams and shares to be moved apart to allow the pipeline to pass between the shares, after which the shares are brought together beneath the pipeline.

Another type of plough is known having a main chassis frame which extends across the pipeline. Two plough body shares are each pivotally connected to the frame and angularly separate to allow the pipeline to pass between them.

Those ploughs have the disadvantage that pitching and downward movements of the plough relative to the pipeline impose large and damaging loads on the pipeline by impact with the structure or chassis frame extending across the pipeline.

SUMMARY OF THE INVENTION

The objects of the invention is to provide a plough in which that disadvantage is reduced or eliminated.

In this specification hereinafter a pipeline, cable or other elongate construction to be entrenched is referred to by the term "pipeline" for convenience.

A plough for entrenching a pipeline according to the invention comprises first and second portions each including a plough body part and an elongate chassis component extending ahead of said plough body part, said portions being connected by bridging structure extending above said chassis components across said pipeline, said plough body parts being separable to allow said pipeline to pass between said parts and said bridging structure being positioned and dimensioned to allow downward and pitching movements of the plough relative to said pipeline.

In one embodiment of plough said bridging structure comprises first and second parts joined to said first and second portions respectively and interconnected by pivot means defining an axis parallel to the lengthwise direction of the plough about which said portions are angularly separable.

BRIEF DESCRIPTION OF THE DRAWINGS

Embodiments of the invention will now be described with reference to the accompanying drawings, in which:

FIGS. 3 to 5 are front elevation of the plough on a reduced scale with parts removed showing three configurations of the plough as a pipeline is loaded into it;

FIG. 6 shows the plough pitching; and

DESCRIPTION OF PREFERRED EMBODIMENTS

Figure 1:
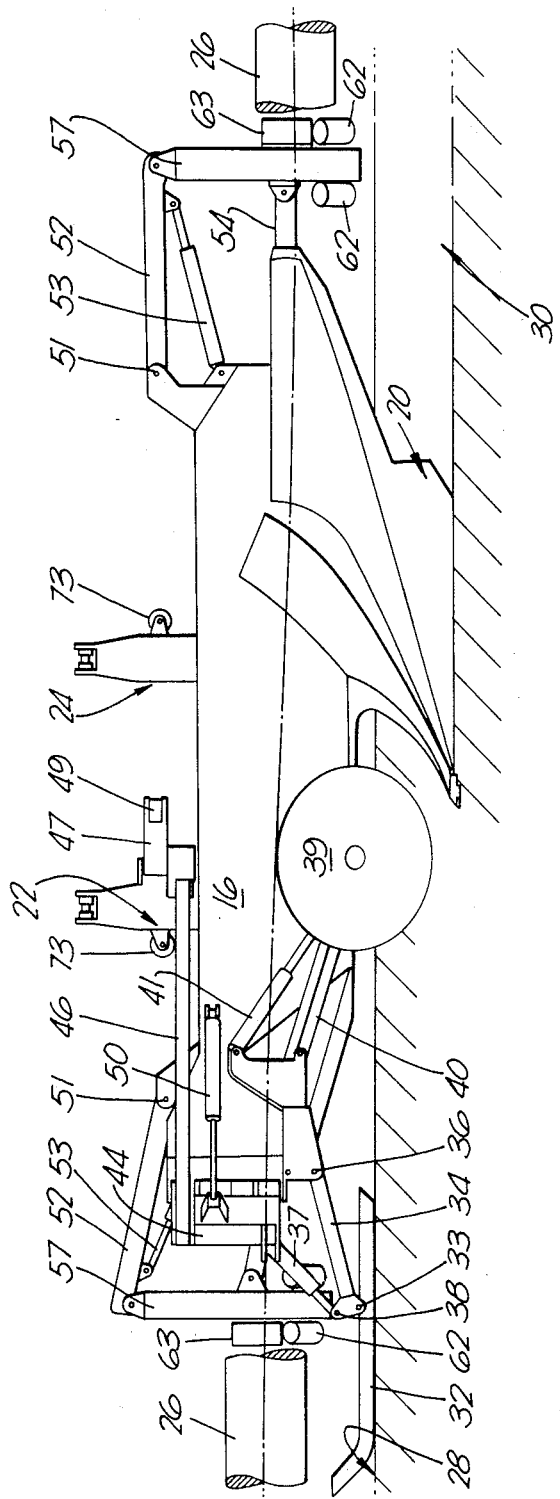
FIGS. 1 and 2 are a side-elevation and a plan, respectively, of a first embodiment.
Figure 2:
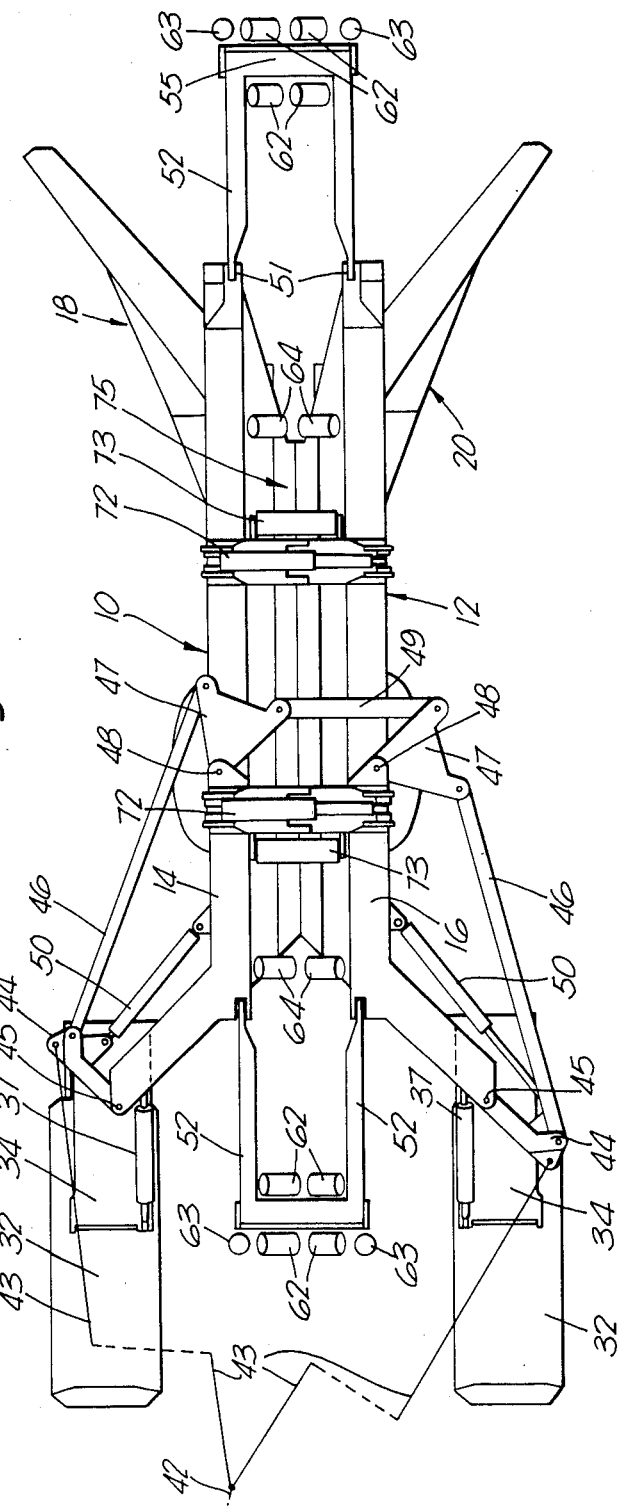

FIGS. 1 to 6 show a plough comprising two portions 10, 12 extending side-by-side lengthwise of the plough. The portions 10, 12 include respective elongate chassis components 14, 16 in the form of beams joined to respective parts 18, 20 of a plough body. The two portions 10, 12 are interconnected by bridging structure in the form of one or preferably (as shown) two pairs of arms 22, 24. The plough is shown in FIGS. 1 and 2 straddling a pipeline 26 already laid on the seabed 28. The plough opens a trench 30 into which the pipeline 26 lowers as the plough advances beneath the pipeline 26, which rises from the seabed 28 as the plough approaches.

The depth at which the plough body 18, 20 works is determined by the setting of two skids 32, each connected at a horizontal pivot 33 to a respective arm 34. Each arm 34 is connected at a horizontal pivot 36 to a respective chassis beam 14, 16. Each arm is adjustable by a hydraulic ram 37 connected at a horizontal pivot 38 to the respective arm 34 and connected at another horizontal pivot (not shown) to the respective beam 14, 16.

Each beam 14, 16 carries a respective rotary disc cutter 39 mounted on an arm 40 adjustable by a hydraulic ram 41. The cutters 39 are mutually inclined so as to cut slits in the ground ahead of the plough body 18, 20 in V relationship.

The plough is hauled along the seabed by a tow cable 42 extending from a surface vessel (not shown) to a bridle 43, the ends of which are connected to the ends of respective arms 44 connected at vertical pivots 45 to respective beams 14, 16. The arms 44 are pivotally connected by links 46 to bell-cranks 47 mounted at vertical pivots 48 on the leading arms 22. The bell-cranks 47 are pivotally interconnected by a link 49. The arms 44 can be turned by respective hydraulic rams 50.

The plough can be steered by operation of the rams 50 which causes a couple to act on the plough in the horizontal plane. When the rams operate the apex of the bridle 43 describes an arc centred at 51 adjacent the centre of ground forces (as seen in plan) acting on the plough body. This minimises the forces required to steer the plough by operation of the rams 50.

Alternatively, the rams 50 can be locked at fixed lengths and the plough steered by change of course of the towing vessel. As a further alternative the rams 50 are allowed to change length freely, the plough being guided by the pipeline 26 which engages rollers on supports to be described next below.

There are two similar supports mounted at respective horizontal pivots 51 at opposite ends of the beams 14, 16. Each support comprises two arms 52 pivotally connected to the pivots 51 and adjustable up and down by hydraulic rams 53. Each support also comprises two further arms 54. The arms 52 are linked by a crosspiece 55 (FIG. 3).

The arms 52, 54 support two carriers 56, 57, which have inwardly-directed brackets 58 inter-connected by a hydraulic ram 59 (FIG. 3).

The carriers 56, 57 each terminate at their lower ends in tapered, inwardly-directed bearers 60, 61 carrying rollers 62. The carriers carry further rollers 63.

The beams 14, 16 carry further rollers 64.

Each portion 10, 12 of the plough comprises two arms 69, one from each pair of arms forming the mechanism 22, 24. The arms 69 extend inwardly from the top margins of the beams 14, 16 and are joined at their upper ends by a horizontal pivot pin 70 (FIG. 3). The pins 70 of the two pairs of arms 22, 24 are coaxial. The arms 69 have upper extension limbs 71 pivotally interconnected by respective hydraulic rams 72. Each pair of arms 22, 24 carries a respective horizontal roller 73 (FIGS. 1 and 2).

OPERATION

The pipeline 26 is laid on the seabed 28 by a lay barge, for example. The plough is lowered from a surface vessel on, for example, four wires or a four-wire sling attached to the "corner" extremities of the plough, which is in open configuration. That is to say, the rams 72 are both retracted so as to pull together the limbs 71 and so separate the arms in each pair 22, 24. The open configuration of the plough, so produced, is shown in FIG. 3. Also, the rams 59 are extended so as to separate the carriers 56, 57 as shown in FIG. 3.

The rams 53 are retracted to position the arms 52, 54 in their lowermost positions. The plough is lowered over the pipeline 26 and the lower edges of the separated beams 14, 16, the plough body parts 18, 20 and the bearers 60, 61 assume positions on the seabed 28 on opposite sides of the pipeline.

The rams 37 are extended fully to lower the skids 32 fully to the positions shown in FIGS. 3 to 5.

Note that the skids 32 rest on the seabed 28 in canted positions.

The pipeline 26 is next picked up from the seabed. One preferred mode of operation is to raise the skids 32 so that the front of the plough is lowered. Next the rams 59 of the front support are retracted by remote operation from the surface vessel. The bearers 60, 61 are forced together and overlap beneath the pipeline 26, which is thus entrapped within the carriers 56, 57 and rests on the rollers 62. The skids 32 can be lowered again and the rear support can be engaged similarly with the pipeline 26.

Next, the rams 53 are extended by remote control to raise the supports at the ends of the beams 14, 16, to the position shown in FIG. 4. Then, the rams 72 are extended by remote control to force the arms in each pair 22, 24 together and to close the beams 14, 16 and plough body parts 18, 20 together in the position shown in FIG. 5. The skids 32 are now level on the seabed 28.

In the closed position, the beams 14, 16 engage each other at their lower longitudinal margins. It is preferred that the beams are locked together by locks to give optimum strength in the chassis structure. The upper longitudinal margins are relieved so that the beams form a trough which extend lengthwise of the plough and which receives the pipeline, supported on the rollers 64 if necessary.

The plough can now be advanced into the seabed 28, the rams 37 being retracted by remote control to raise the skids 32 so that the plough body 18, 20 is caused to bite downwardly into the seabed. The depth of working of the plough is determined by the setting of the skids 32.

The plough is now advanced along the pipeline 26 for form the trench 30. As shown the trench 30 is just deep enough to accommodate the pipeline which in this case is typically some 1016 millimeters (40 inches) in diameter (FIG. 1). The two plough body parts 18, 20 are forced together by ground forces as the plough advances and the rams 72 also assist in keeping the plough closed. Also, the tensions in the bridle 43 counteract the tendency of ground forces on the skids 32 to open the plough.

As the plough operates, it is caused to move up and down, and to pitch, relatively to the pipeline 26. When the plough pitches, it turns in a vertical plane so as to change its inclination. Pitching may occur in either rotary sense. The generous clearance between the top of the pipeline and the arms 22, 24 allows such pitching movements to occur without impact between the plough and the pipeline. Also, the elevated structure formed by the pairs of arms 22, 24 occupies considerably less than the overall length of the beams 14, 16 so that the ends of the beams can freely move up and down against the median level of the pipeline.

The arms 69 are subjected during ploughing to only relatively low forces. The applied towing force is transmitted directly through the beams 14, 16 to the plough body 18, 20. Since the forces are low, the arms 69 can be quite highly elevated to allow generous clearance above the pipeline and the mechanism formed by the arms 69 occupies quite a short overall length of the beams 14, 16 allowing generous clearance for pitching. The beams 14, 16 occupy low positions and are therefore subject to minimal bending loads. By contrast in the known ploughs previously mentioned considerable loads are imposed on the bridging structure which is required to transmit at least a major proportion of the applied towing force, or the large resulting bending moment.

The supports at the ends of the beams 14, 16, although not essential, are preferred for use with at least larger pipelines. Each ram 53 is connected to a hydraulic accumulator containing gas under pressure so that as the plough rises and falls or pitches the rams 53 can maintain the rollers 62 in supporting engagement with the pipeline as the rams extend or retract automatically to allow the arms 52, 54 to rise and fall to accommodate the plough's movements.

The pivot connections between the bell-cranks 47 and the link 49; the mountings of the rollers 73; and the pivot connections 51 and between the arms 52, 54 and the remainder of the support assemblies are such as to allow the separation of the beams 14, 16 when the rams 72 retract.

MODIFICATIONS

Some examples of modifications are:

(a) the two portions of the plough may be moved to the pipeline separately, assembled together and connected by for example pins similar to the pins 70, preferably together with additional fastening means, for example interconnecting the plough body parts;

(b) the two portions of the plough are interconnected by mechanism other than the arms 69; for example links or slide mechanism;

(c) one or both of the supports at the ends of the beams 14, 16 is or are dispensed with; or the or each support is placed on the beam at a position different from that shown;

(d) the adjustable steering mechanism is dispensed with and the bridle or tow wire is connected directly to the plough;

(e) the two portions 10, 12 instead of being similar may be dissimilar. For example, as seen in elevation the plough body parts may abut one another, when closed, at a plane or other surface offset from the central vertical plane, for example at a plane downwardly diverging from the vertical.

(f) the two portions may be lowered from the sea surface on wires which pull the portions 10, 12 apart, the portions being forced together without ram action by ground forces when the plough is hauled forwardly.

FIG. 6 shows the plough pitching forwadly relatively to the pipeline 26 as the leading point of the plough body 18, 20 is forced to ride up out of the trench 30 upon encountering a large boulder 80. The upper inner boundary of the leading pair of arms 22 of the bridging structure is the leading roller 73, which has moved downwardly relatively to the pipeline 26. The roller 73 may engage the top of the pipeline 26, as shown, in extreme pitching.

The pipeline 26 continues to be supported by the bearers 60, 61. Their rollers 62 are kept in engagement with the pipeline by the hydraulic accumulators connected to the rams 53, one of which pushes the leading parallel linkage 52, 54 upwards and the other of which yields as the trailing linkage is forced downwards by the pipeline 26. For example, the angle of pitching allowed by the pitching of the bridging structure 22, 24, preferably in the central third of the length of the beams 14, 16, may be plus or minus nine degrees away from the horizontal. The downward movement of the plough relative to the pipeline is, for example, one metre or more. As great a pitching angle and as great a downward movement as possible are preferable.

The condition shown in FIG. 6 is usually the most serious encountered. Undulating ground causes up and down movement and pitching. Soft ground causes the plough to sink and without the downward movement relative to the pipeline allowed by the bridging structure as provided by the invention, the plough can "hang" on the pipeline so that the plough's weight imposes high stress and load on the pipeline. Without the relative pitching movement of the plough allowed by the invention, the effects of boulders or rocks or undulating ground would also cause high loads, stresses, impacts and bending moments on both the plough and the pipeline. Any of those effects can damage the pipeline or its concrete, epoxy resin or other coating. All of those effects are caused when known ploughs operate.

Figure 7:
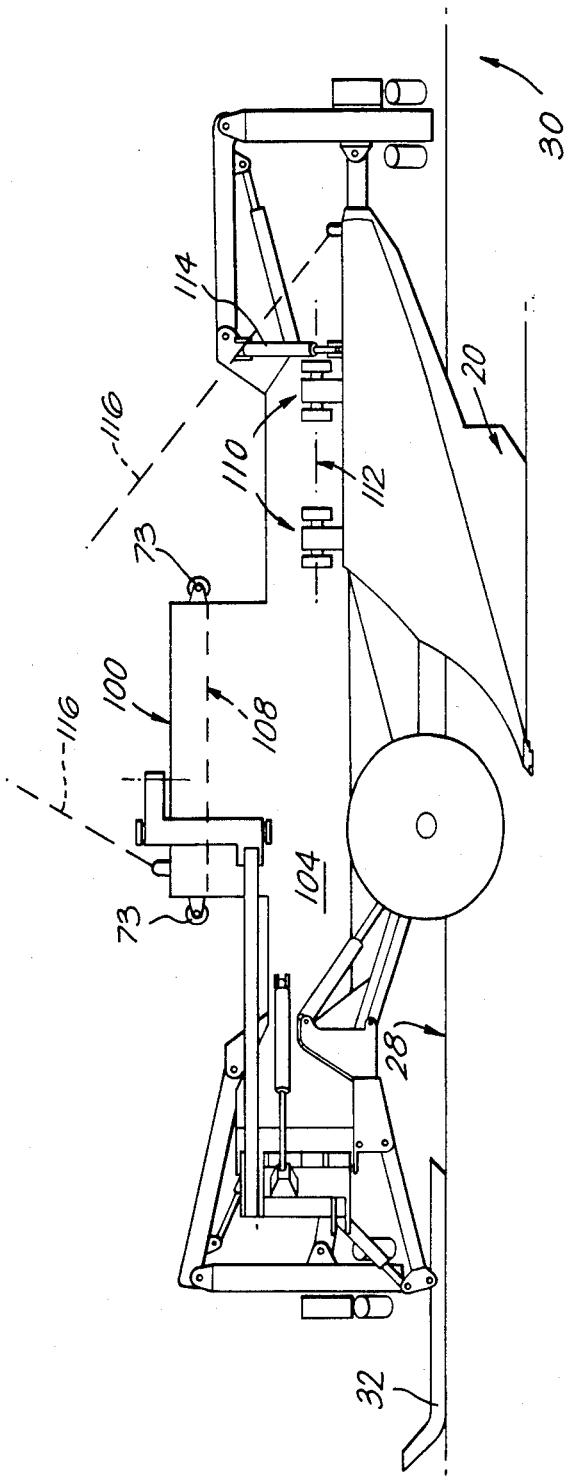
FIGS. 7 and 8 shows a second embodiment.
Figure 8:
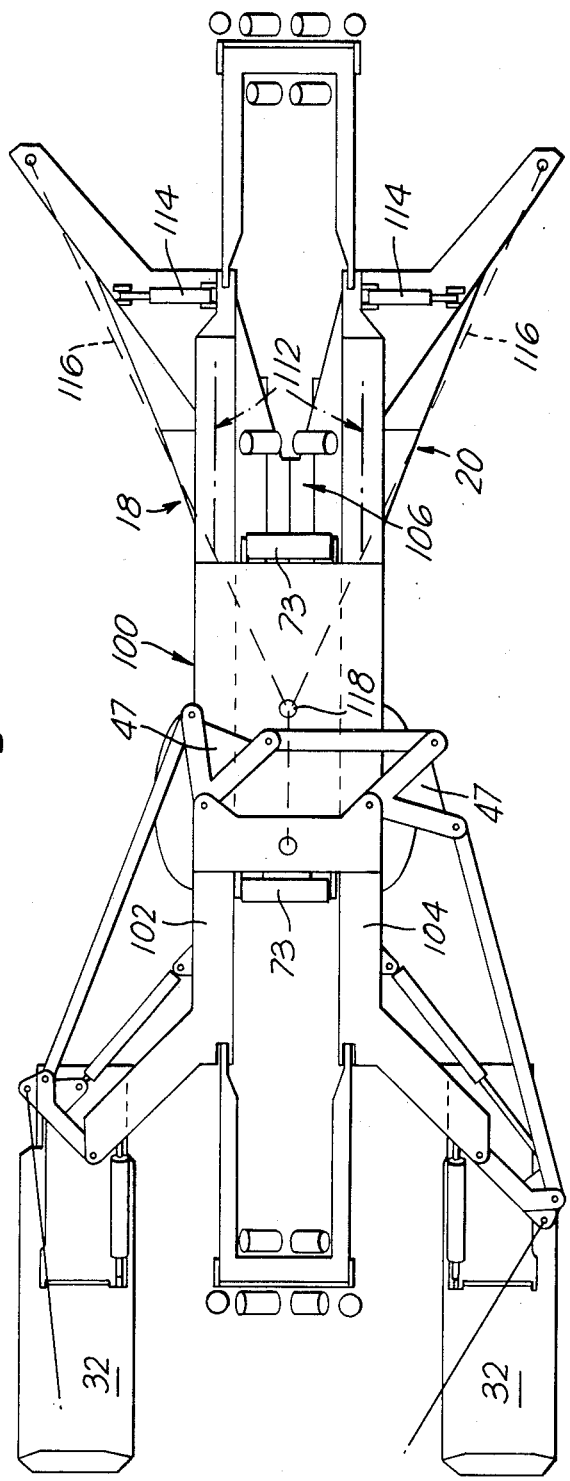

FIGS. 7 and 8 show a second embodiment in which many of the parts are the same as those already described. However, instead of pivotally connected arms, the two portions of the plough are rigidly connected to bridging structure 100 preferably in the central third of the two beams 102, 104. The forwad ends of the beams 102, 104 no longer meet each other at their lowest margins. However the plough body parts 18, 20 do meet as before to exclude loose rocks from entering the pipeline channel 106 within the plough. The mounting of the supports, the rollers 73 and the arms 47 are simplified since the beams 14, 16 are relatively immovable.

The bridging structure 100 is a single structure having an inner surface 108 bounding the roof of the structure.

Each plough body part 18, 20 is pivotally connected to its respective beam 102, 104 by two hinge assemblies 110 defining a pivot axis 112 parallel to the lengthwise direction of the plough. Each part 18, 20 has a respective hydraulic ram 114 operable to move the part about its axis 112 to separate the plough body parts to allow the pipeline 26 to pass between them.

As with the first embodiment when the plough is to be separated from the pipeline, it is brought out of work by lowering the skids 32 as the plough comes to a halt. This brings the plough body out of the ground. The rams 114 are operated to separate the parts 18, 20. After a check to ensure that the parts are clear of the pipeline 26 the plough is lifted clear on a three-wire sling as indicated at 116. The hoist cable is connected to the sling at 118. Should the hydraulics fail, the hoist can pull the body parts 18, 20 apart to clear the plough from the pipeline. The first embodiment can also be operated, and opened by the hoist in the event of hydraulic failure, in a similar manner.

We claim:

1. A plough for entrenching a pipeline comprising first and second portions, each said portion including a plough body part and an elongated chassis component extending ahead of said plough body part, said portions together defining a trough between said chassis components in which trough a pipeline can be received in an elevated position where a seabed, said trough having a base surface beneath the pipeline, said elongate chassis components having respective leading ends, said portions being connected by bridging structure extending across said trough and the pipeline therein, said plough further comprising means engagable with the underside of the pipeline to prevent damaging engagement between the underside of the pipeline and said base surface of said trough, and further comprising hinge means permitting each of said plough body parts to separate from the other by movement about a hinge axis extending lengthwise of said plough to allow the pipeline to pass between said parts during installation of said plough on the pipeline and removal therefrom, and said bridging structure being spaced rearwardly from said leading ends of said chassis components to allow said plough to execute pitching movements without imposing damaging loads upon the pipeline by engagement with the upper side thereof.

2. A plough for entrenching a pipeline comprising first and second portions, each said portion including a plough body part and an elongated chassis component extending ahead of said plough body part, said portions together defining a trough between said chassis components in which trough a pipeline can be received in an elevated position above a seabed, said trough having a base surface beneath the pipeline, said elongate chassis components having respective leading ends, said portions being connected by bridging structure extending across said trough and the pipeline therein, said plough further comprising means engagable with the underside of the pipeline to prevent damaging engagement between the underside of the pipeline and said base surface of said trough, said bridging structure including hinge means permittign relative separating movement of said portions about a hinge axis extending lengthwise of said plough to allow the pipeline to pass between said plough body parts during installation of said plough on the pipeline and removal therefrom, and said bridging structure being spaced rearwardly from said leading ends of said chassis components to allow said plough to execute pitching movements without imposing damaging loads upon the pipeline by engagement with the upper side thereof.

3. A plough for entrenching a pipeline comprising first and second portions, each said portion including a plough body part and an elongated chassis component extending ahead of said plough body part, said portions together defining a trough between said chassis components in which trough a pipeline can be received in an elevated position above a seabed, said trough having a base surface beneath the pipeline, said elongate chassis components having respective leading ends, said portions being connected by bridging structure extending across said trough and the pipeline therein, said plough further comprising means engagable with the underside of the pipeline to prevent damaging engagement between the underside of the pipeline and said base surface of said trough, said portions including respective hinge means permitting each said respective plough body part to separate from the other by movement about a respective hinge axis extending lengthwise of said plough to allow the pipeline to pass between said plough body parts during installation of said plough on the pipeline and removal therefrom, and said bridging structure being spaced rearwardly from said leading ends of said chassis components to allow said plough to execute pitching movements without imposing damaging loads upon the pipeline by engagement with the upper side thereof.

4. A plough according to claim 1, 2 or 3 comprising support means engagable with the underside of the pipeline and at least one assembly which carries said support means and which can yield to accommodate relative movement between said plough and the pipeline while maintaining said support means in supporting engagement with the pipeline.

5. A plough according to claim 1, 2 or 3 comprising support means engagable with the underside of the pipeline and at least one assembly carrying said support means and comprising hydraulic ram means operable to raise said support means to lift the pipeline to move the pipeline between said plough body parts while they are separated, said hydraulic ram means being operable to maintain said support means in yielding supporting engagement with the underside of the pipeline as said plough moves up and down and pitches during ploughing.

6. A plough according to claim 1, 2 or 3, said elongate chassis components having respective trailing ends and said bridging structure being spaced forwardly from said trailing ends of said chassic components.

* * * * *

UNITED STATES PATENT AND TRADEMARK OFFICE
CERTIFICATE OF CORRECTION

PATENT NO. : 4,802,793

DATED : February 7, 1989

INVENTOR(S) : Timothy W. Grinsted, Alan R. Reece

It is certified that error appears in the above-identified patent and that said Letters Patent is hereby corrected as shown below:

Please Change

In Claim 1, Column 6, Line 27    "where" to --above--

In Claim 1, Column 6, Line 31    "actross" to --across--

In Claim 2, Column 6, Line 61    "permittign" to --permitting--

In Claim 6, Column 8, Line 25    "chassic" to --chassis

Signed and Sealed this

Twenty-ninth Day of August, 1989

Attest:

DONALD J. QUIGG

*Attesting Officer*    *Commissioner of Patents and Trademarks*